United States Patent
Imamura

(10) Patent No.: US 6,574,007 B1
(45) Date of Patent: Jun. 3, 2003

(54) IMAGE FORMING APPARATUS AND METHOD

(75) Inventor: Nobuyuki Imamura, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,661

(22) Filed: Mar. 8, 2000

(51) Int. Cl.⁷ ............................................. G06F 12/00
(52) U.S. Cl. ........................ 358/1.16; 358/1.17; 358/404
(58) Field of Search ............................. 358/1.16, 404, 358/1.17

(56) References Cited

U.S. PATENT DOCUMENTS

| | | | |
|---|---|---|---|
| 5,208,676 A | * 5/1993 | Inui | 358/1.15 |
| 5,771,103 A | 6/1998 | Ogino | 358/437 |
| 5,912,693 A | * 6/1999 | Katsuma et al. | 347/191 |
| 5,963,717 A | * 10/1999 | Imamura | 358/1.15 |
| 6,040,917 A | * 3/2000 | Campbell et al. | 358/1.17 |
| 6,052,201 A | * 4/2000 | Shibaki et al. | 358/1.12 |
| 6,057,940 A | 5/2000 | Kawamoto | 358/404 |

FOREIGN PATENT DOCUMENTS

| | | |
|---|---|---|
| JP | 9-130524 | 5/1997 |
| JP | 10-271300 | 10/1998 |
| JP | 11-313182 | 11/1999 |

* cited by examiner

Primary Examiner—Edward Coles
Assistant Examiner—Alan Rahimi
(74) Attorney, Agent, or Firm—Foley & Lardner

(57) ABSTRACT

A first image is read, and first image data corresponding to the read image is written in a first memory area. The first image data is stored in an image data storage section. Concurrently with this storage processing, the first image data written in the first memory area is read out, and a predetermined number of copies of the first image based on the first image data are printed. A second image following the first image is read, and second image data corresponding to the read image is stored in a second memory area different from the first memory area. The second image data is stored in the image data storage section. After the first image is printed, the second image data stored in the image data storage section is read out to the first memory area, and a predetermined number of copies of the second image based on the second image data are printed.

6 Claims, 2 Drawing Sheets

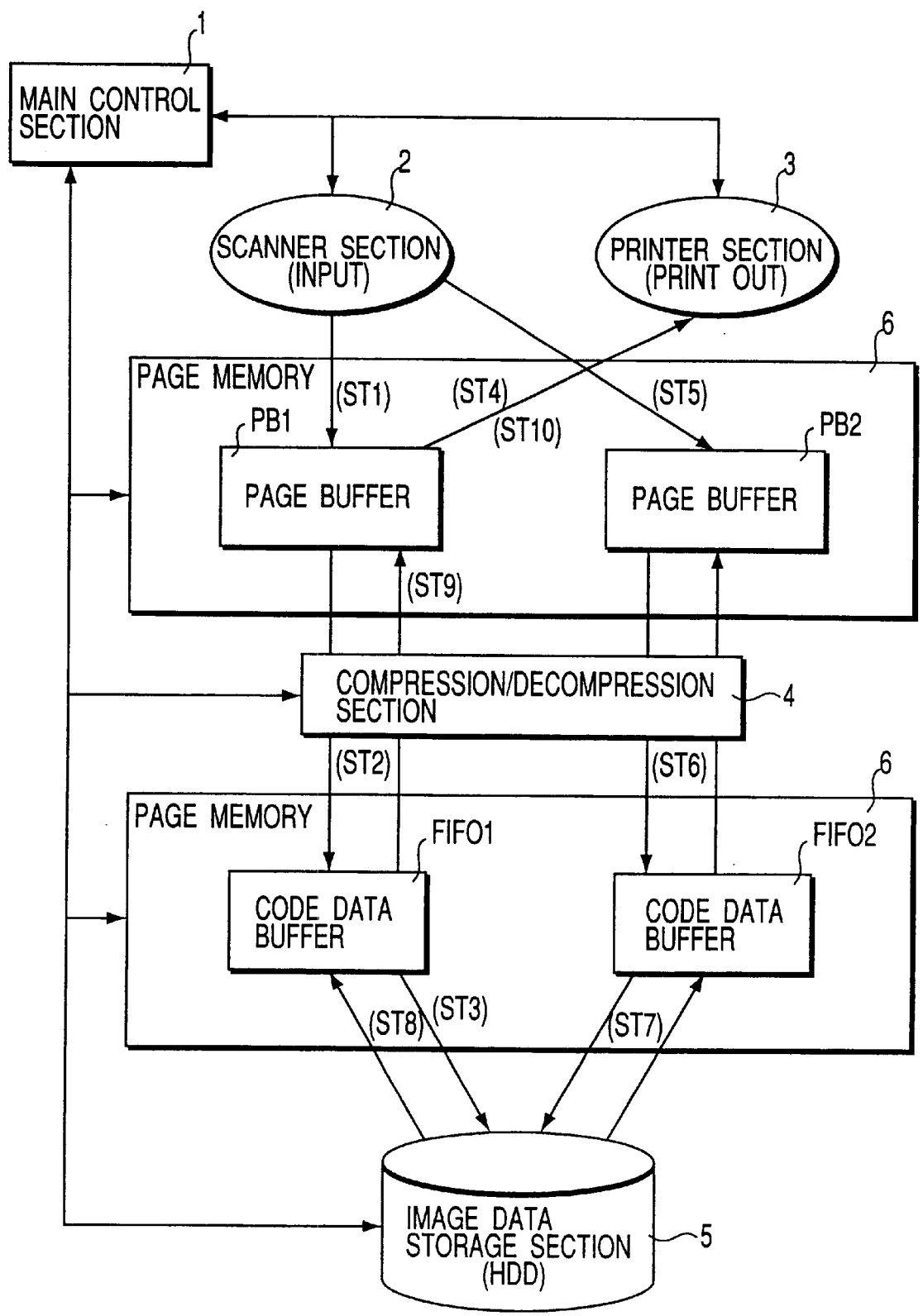
F I G. 1

IMAGE FORMING APPARATUS AND METHOD

BACKGROUND OF THE INVENTION

Recently, research and development of digital copying machines has been enthusiastically pursued. A digital copying machine has a storage section for storing image data. The digital copying machine reads all images to be copied, and stores the image data obtained by the reading in the storage section. Thereafter, the image data are sequentially read out from the storage section to be printed. The digital copying machine executes a plural copy group mode and plural copy non-sort/non-staple mode by using such a memory function. In the plural copy group mode, when the first paper sheet (first page), in the order of originals, is printed in a designated number, these copies are discharged as one group. Subsequently, when the second paper sheet (second page) is printed in a designed number, these copies are discharged as one group (with discrimination among the respective groups). In the plural copy non-sort/non-staple mode, the first paper sheet (first page), in the order of originals, is printed in a designated number and discharged, and the second paper sheet (second page) is printed in a designated number and discharged in succession (without discrimination among the respective groups).

In the plural copy group mode and plural copy non-sort/non-stable mode using the above memory function, however, the copying machine sequentially starts printing images to be copied after all the images are read. For this reason, it takes much time before the first print operation starts.

BRIEF SUMMARY OF THE INVENTION

The present invention has been made to solve the above problem, and has as its object to provide an image forming method and apparatus which can shorten the time required before the first print operation can be started while using a memory copying function.

(1) An image forming method of the present invention comprises the first step of reading a first image and writing first image data corresponding to the read image in a first memory area, the second step of compressing the first image data written in the first memory area in the first step and writing the data in a second memory area, the third step of storing, in an image data storage section, the compressed first image data written in the second memory area in the second step, the fourth step of reading out the first image data written in the first memory area and printing a predetermined number of copies of the first image based on the first image data concurrently with the second step, the fifth step of reading a second image following the first image and writing second image data corresponding to the read image in a third memory area, the sixth step of compressing the second image data written in the third memory area in the fifth step and writing the data in a fourth memory area, the seventh step of storing, in the image data storage section, the compressed second image data written in the fourth memory area in the sixth step, the eighth step of reading out the compressed second image data stored in the image data storage section and writing the data in the second memory area, the ninth step of decompressing the compressed second image data written in the second memory in the eighth step and writing the data in the first memory area, and the 10th step of reading out the decompressed second image data written in the first memory area in the ninth step and printing a predetermined number of copies of the second image based on the second image data.

(2) An image forming apparatus of the present invention comprises a scanner section for reading an image, first, second, third, and fourth memory areas for storing image data, an image data storage section for storing image data, a compression/decompression section for compressing and decompressing image data, a printer section for printing an image based on image data, and a control section for controlling processing from an image read by the scanner section to image printing by the printer section, the control means executing the first step of causing the scanner section to read a first image, and writing first image data corresponding to the read image in the first memory area, the second step of causing the compression/decompression section to compress the first image data written in the first memory area in the first step, and writing the data in the second memory area, the third step of storing, in the data storage section, the compressed first image data written in the second memory area in the second step, the fourth step of reading out the first image data written in the first memory area and causing the printer section to print a predetermined number of copies of the first image based on the first image data concurrently with the second step, the fifth step of causing the scanner section to read a second image following the first image, and writing second image data corresponding to the read image in the third memory area, the sixth step of causing the compression/decompression section to compress the second image data written in the third memory area in the fifth step, and writing the data in the fourth memory area, the seventh step of storing, in the image data storage section, the compressed second image data written in the fourth memory area in the sixth step, the eighth step of reading out the compressed second image data stored in the image data storage section and writing the data in the second memory area, the ninth step of causing the compression/decompression section to decompress the compressed second image data written in the second memory area in the eighth step, and writing the data in the first memory area, and the 10th step of reading out the decompressed second image data written in the first memory area in the ninth step, and causing the printer section to print a predetermined number of copies of the second image based on the second image data.

BRIEF DESCRIPTION OF THE SEVERAL VIEWS OF THE DRAWING

FIG. 1 is a view showing the schematic arrangement of an image forming apparatus according to the present invention and the flow of image data.

DETAILED DESCRIPTION OF THE INVENTION

Figure 2:
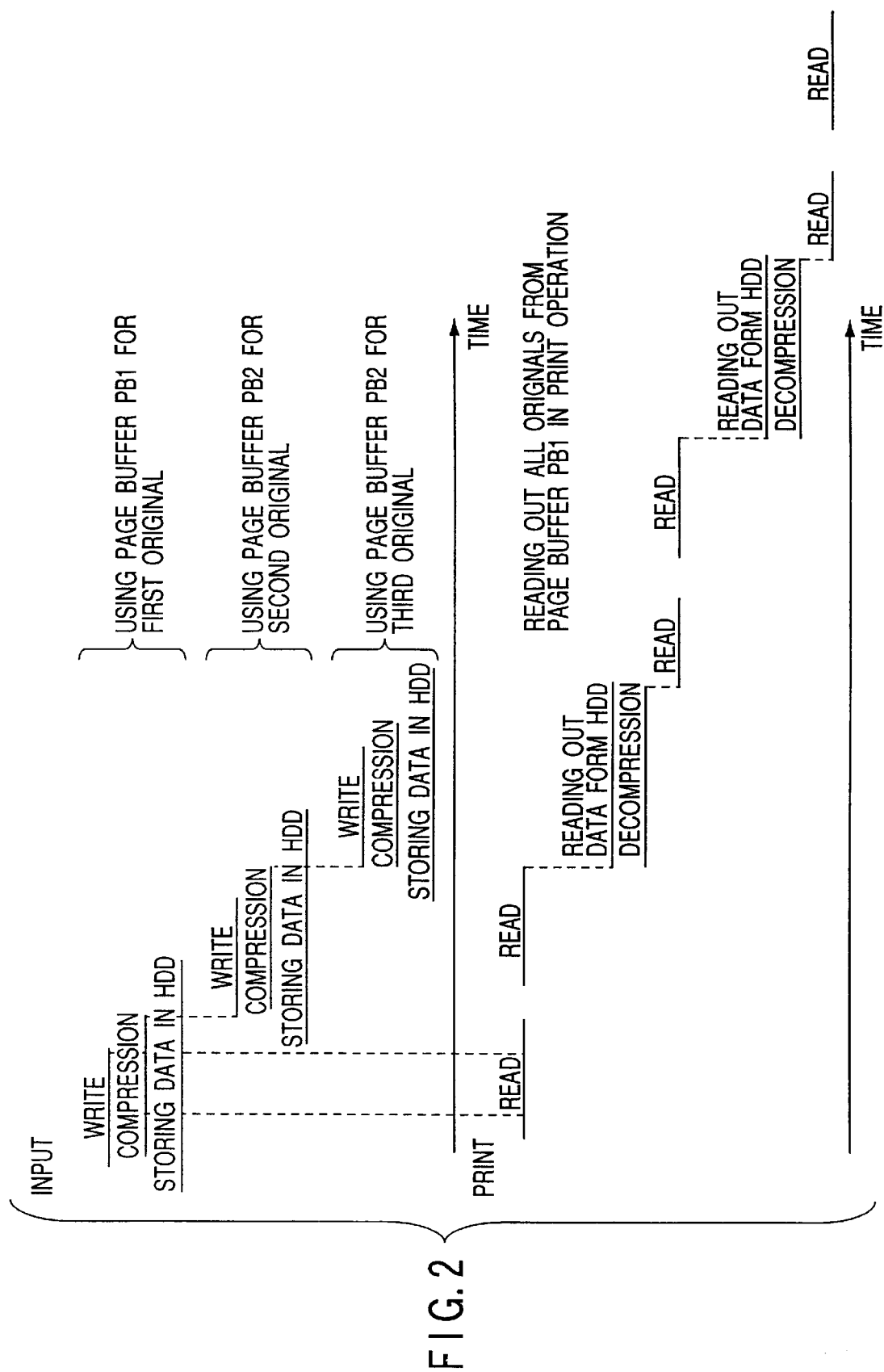
FIG. 2 is a timing chart showing the respective timings from the image read timing to the printout timing.

FIG. 1 is a block diagram showing the schematic arrangement of an image forming apparatus according to the present invention and the flow of image data. As shown in FIG. 1, the image forming apparatus includes a main control section 1, scanner section 2, printer section 3, compression/decompression section 4, image data storage section 5, page memory 6, and the like. The main control section 1 controls the overall image forming apparatus. The main control section 1 controls the timing of original image read by the scanner section 2, the timing of image data write in the page memory 6, and the like. The scanner section 2 reads an original image placed at a predetermined scan position, and outputs image data corresponding to the original image. Note that this image forming apparatus has an automatic document feeder (not shown). This automatic document feeder conveys originals to be read to the scan position one by one. The printer section 3 prints images in accordance with the image data. The compression/decompression section 4 compresses and decompresses image data. The image data storage section 5 is a HDD (Hard Disk Drive) or the like and stores a large volume of image data corresponding to a plurality of pages of original images. The page memory 6 is divided into a predetermined number of memory areas, as needed, when it is used. For example, this memory is divided into a page buffer PB1, page buffer PB2, coded data buffer FIFO1, and coded data buffer FIFO2.

The flow of image data, from the instant at which original images are read to the instant at which images are printed, in the execution of the plural copy group mode and plural copy non-sort/non-staple mode will be described with reference to FIG. 1. Assume that the first original image (leading original image), the second original image, the third original image, and the fourth original image (trailing original image) are processed as original images.

First of all, the originals to be read are conveyed to the scan position by the automatic document feeder one by one. Assume that the first original image is conveyed to the scan position first. At this time, the scanner section 2 reads the first original image. The first image data corresponding to the read first original image is written in the page buffer PB1 (ST1). The first image data written in the page buffer PB1 is compressed by the compression/decompression section 4 and written in the coded data buffer FIFO1 (ST2). The compressed first image data written in the coded data buffer FIFO1 is stored in the image data storage section 5 (ST3). Concurrently with the processing in ST2, the first image data written in the page buffer PB1 is read out, and a predetermined number of copies of the first image (corresponding to the first original image) based on the first image data are printed by the printer section 3 (ST4).

After the first original image is completely read by the scanner section 2, the second original image is conveyed to the scan position. At this time, the scanner section 2 reads the second original image. The second image data corresponding to the read second original image is written in the page buffer PB2 (ST5). The second image data written in the page buffer PB2 is compressed by the compression/decompression section 4 and written in the coded data buffer FIFO2 (ST6). The compressed second image data written in the coded data buffer FIFO2 is stored in the image data storage section 5 (ST7). The compressed second image data stored in the image data storage section 5 is read out and written in the coded data buffer FIFO1 (ST8). After ST4, the compressed image data written in the coded data buffer FIFO1 in ST8 is decompressed by the compression/decompression section 4 and written in the page buffer PB1 (ST9). The second image data written in the page buffer PB1 is read out, and a predetermined number of copies of the second image (corresponding to the second original image) based on the second image data are printed by the printer section 3 (ST10).

A predetermined number of copies of the third original image following the second original image are printed in the same manner as the second original image. A predetermined number of copies of the fourth original image following the third original image are printed in the same manner as the second original image.

Alternatively, only the fourth original image as the final original image may be printed out by a predetermined number of copies in the following manner. After the third image data corresponding to the third original image is compressed by the compression/decompression section 4 and written in the coded data buffer FIFO2, this apparatus starts reading the fourth original image. That is, the fourth original image is conveyed to the scan position and read by the scanner section 2. The fourth image data corresponding to the fourth original image is written in the page buffer PB2. At this time, the fourth image data written in the page buffer PB2 is read out, and a predetermined number of copies of the fourth image (corresponding to the fourth original image) based on the fourth image data are printed by the printer section 3. Concurrently with this printing, the fourth image data written in the page buffer PB2 may be compressed and stored in the image data storage section 5.

According to the prior art, when copying operation is performed in the plural copy group mode and plural copy non-sort/non-staple mode, printing starts after all original images as copy targets are read. For this reason, it takes much time before the first page is printed. The image forming apparatus of the present invention efficiently uses a plurality of page buffers to print original images while reading originals. This makes it possible to shorten the time required before the first page can be printed.

The image formation timing will be described next with reference to the timing chart of FIG. 2. Assume that the number of original images is three (the first to third original images), and the number of copies is two.

The first image data corresponding to the first original image as the first original is bitmapped (written) in the page buffer PB1, and is compressed and stored in the image data storage section 5 (HDD or the like). After the compression of the first original image is completed, the second image data corresponding to the second original image as the second original is bitmapped (written) in the page buffer PB2, and is compressed and stored in the image data storage section 5. Likewise, after the compression of the second original image is completed, the third image data corresponding to the third original image as the third original is bitmapped (written) in the page buffer PB2, and is compressed and stored in the image data storage section 5.

The first image data corresponding to the first original image is bitmapped in the page buffer PB1, and at the same time, read out to the printer section 3 to be printed. In this case, the data is read out twice because two copies are printed. After the first image data is completely read out, the second image data is read out from the image data storage section 5, decompressed, and bitmapped in the page buffer PB1. This data is further read out to the printer section 3 to be printed. In this case, the data is read out twice because two copies are printed. Likewise, after the second image data is completely read out, the third image data is read out from the image data storage section 5, decompressed, and bitmapped in the page buffer PB1. This data is further read out to the printer section 3 to be printed. In this case, the data is read out twice because two copies are printed. Note that the third image data may be read out from the page buffer PB1 to be printed without the mediacy of the image data storage section 5, as described above.

As described with reference to FIG. 1, the flows of image data, from the instant at which an original image is read to the instant at which the image is printed, in the execution of the plural copy group mode and plural copy non-sort/non-staple mode, can be classified into four routes. The first route is "scanner section 2→ page buffer PB1→ printer section 3". The second route is "scanner section 2→ page buffer PB1→ compression/decompression section 4→ coded data buffer FIFO1→ image data storage section 5". The third route is "scanner section 2→ page buffer PB2→ compression/decompression section 4→ coded data buffer FIFO2→ image data storage section 5". The fourth route is "image data storage section 5→ coded data buffer FIFO1→ compression/decompression section 4→ page buffer PB1→ scanner section 2".

This apparatus has the function of monitoring the occurrence of an abnormality and can recognize, in the event of occurrence of any abnormality, a specific route and specific image data in which the abnormality has occurred. The user is notified of the abnormality recognition result by turning on an LED on a control panel (not shown). This allows the user to accurately know a specific route and specific image data in which the abnormality has occurred and efficiently perform maintenance.

What is claimed is:

1. An image forming method comprising:
   a first step of reading a first image and writing first image data corresponding to the read image in a first memory area serving as a memory dedicated mainly for outputting:
   a second step of storing, in an image data storage section, the first image data written in the first memory area in the first step;
   a third step of reading out the first image data written in the first memory area and printing a predetermined number of copies of the first image based on the first image data concurrently with the second step;
   a fourth step of reading a second image following the first image and writing second image data corresponding to the read image in a second memory area serving as a memory dedicated mainly for inputting;
   a fifth step of storing, in the image data storage section, the second image data written in the second memory area in the fourth step; and
   a sixth step of reading out the second image data stored in the image data storage section to the first memory area and printing a predetermined number of copies of the second image based on the second image data after the third step.

2. An image forming method according to claim 1, wherein a predetermined number of copies of each of third and subsequent images following the second image are printed in the same manner as the second image after the fifth step, by inputting said each of the third and subsequent images through the second memory area serving as the memory dedicated mainly for inputting and outputting said each of the third and subsequent images through the first memory area serving as the memory dedicated mainly for outputting.

3. An image forming method comprising:
   a first step of reading a first image and writing first image data corresponding to the read image in a first memory area serving as a memory dedicated mainly for outputting;
   a second step of compressing the first image data written in the first memory area in the first step and writing the data in a second memory area;
   a third step of storing, in an image data storage section, the compressed first image data written in the second memory area in the second step,
   a fourth step of reading out the first image data written in the first memory area and printing a predetermined number of copies of the first image based on the first image data concurrently with the second step;
   a fifth step of reading a second image following the first image and writing second image data corresponding to the read image in a third memory area serving as a memory dedicated mainly for inputting;
   a sixth step of compressing the second image data written in the third memory area in the fifth step and writing the data in a fourth memory area;
   a seventh step of storing, in the image data storage section, the compressed second image data written in the fourth memory area in the sixth step;
   a eighth step of reading out the compressed second image data stored in the image data storage section and writing the data in the second memory area;
   a ninth step of decompressing the compressed second image data written in the second memory in the eighth step and writing the data in the first memory area after the fourth step; and
   a tenth step of reading out the decompressed second image data written in the first memory area in the ninth step and printing a predetermined number of copies of the second image based on the second image data.

4. An image forming method according to claim 3, wherein a predetermined number of copies of each of third and subsequent images following the second image are printed in the same manner as the second image after the sixth step, by inputting said each of the third and subsequent images through the third memory area serving as the memory dedicated mainly for inputting, and outputting said each of the third and subsequent images, through the first memory area serving as the memory dedicated mainly for outputting.

5. An image forming apparatus comprising:
   a scanner section for reading an image;
   first, second, third, and fourth memory areas for storing image data, the first memory area serving as a memory dedicated mainly for outputting, the third memory area serving as a memory dedicated mainly for inputting;
   an image data storage section for storing image data,
   a compression/decompression section for compressing and decompressing image data;
   a printer section for printing an image based on image data; and
   a control section for controlling processing from an image read by said scanner section to image printing by said printer section,
   said control means executing:
      a first step of causing said scanner section to read a first image, and writing first image data corresponding to the read image in said first memory area serving as the memory dedicated mainly for outputting;
      a second step of causing said compressional decompression section to compress the first image data written in said first memory area in the first step, and writing the data in said second memory area;
      a third step of storing, in said data storage section, the compressed first image data written in said second memory area in the second step;
      a fourth step of reading out the first image data written in said first memory area and causing said printer section to print a predetermined number of copies of the first image based on the first image data concurrently with the second step;

a fifth step of causing said scanner section to read a second image following the first image, and writing second image data corresponding to the read image in said third memory area serving as the memory dedicated mainly for inputting;

a sixth step of causing said compression/decompression section to compress the second image data written in said third memory area in the fifth step, and writing the data in said fourth memory area;

a seventh step of storing, in said image data storage section, the compressed second image data written in said fourth memory area in the sixth step, a eighth step of reading out the compressed second image data stored in said image data storage section and writing the data in said second memory area;

a ninth step of causing said compression/decompression section to decompress the compressed second image data written in said second memory area in the eighth step, and writing the data in said first memory area after the fourth step; and a tenth step of reading out the decompressed second image data written in said first memory area in the ninth step, and causing said printer section to print a predetermined number of copies of the second image based on the second image data.

6. An image forming apparatus according to claim 5, wherein said control section further executes a step of printing a predetermined number of copies of each of third and subsequent images following the second image in the same manner as the second image after the sixth step, by inputting said each of the third and subsequent images through the third memory area serving as the memory dedicated mainly for inputting, and outputting said each of the third, and subsequent images through the first memory area serving as the memory dedicated mainly for outputting.

* * * * *